United States Patent
Morita et al.

(10) Patent No.: US 9,432,607 B2
(45) Date of Patent: Aug. 30, 2016

(54) SOLID-STATE IMAGING APPARATUS AND IMAGING SYSTEM

(71) Applicant: CANON KABUSHIKI KAISHA, Tokyo (JP)

(72) Inventors: Hiroyuki Morita, Ebina (JP); Hiroo Akabori, Fujisawa (JP); Koichiro Iwata, Kawasaki (JP); Takeshi Akiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/805,623

(22) Filed: Jul. 22, 2015

(65) Prior Publication Data
US 2016/0050380 A1 Feb. 18, 2016

(30) Foreign Application Priority Data
Aug. 14, 2014 (JP) ................. 2014-165223

(51) Int. Cl.
*H04N 5/378* (2011.01)
*H04N 5/3745* (2011.01)
*H04N 5/376* (2011.01)

(52) U.S. Cl.
CPC ............ *H04N 5/378* (2013.01); *H04N 5/3765* (2013.01); *H04N 5/37457* (2013.01)

(58) Field of Classification Search
None
See application file for complete search history.

(56) References Cited

U.S. PATENT DOCUMENTS

| | | | |
|---|---|---|---|
| 7,719,586 B2 | 5/2010 | Koseki | |
| 7,741,593 B2 | 6/2010 | Iwata et al. | |
| 8,013,369 B2 | 9/2011 | Iwata et al. | |
| 8,081,245 B2 | 12/2011 | Itano et al. | |
| 8,159,577 B2 | 4/2012 | Iwata et al. | |
| 8,598,901 B2 | 12/2013 | Hiyama et al. | |
| 8,670,058 B2 | 3/2014 | Hayashi et al. | |
| 8,885,082 B2 | 11/2014 | Noda et al. | |
| 8,928,786 B2 | 1/2015 | Iwata et al. | |
| 9,118,857 B2 | 8/2015 | Iwata et al. | |
| 2005/0168603 A1* | 8/2005 | Hiyama | H04N 5/378 348/294 |
| 2008/0259193 A1* | 10/2008 | Toya | H04N 5/217 348/300 |
| 2011/0141332 A1* | 6/2011 | Noda | H04N 5/3698 348/300 |
| 2012/0268633 A1* | 10/2012 | Sambonsugi | H04N 5/343 348/300 |
| 2012/0307100 A1* | 12/2012 | Iwane | H04N 5/335 348/222.1 |
| 2014/0333815 A1* | 11/2014 | Iwane | H04N 5/378 348/308 |

FOREIGN PATENT DOCUMENTS

JP 2005-143078 6/2005

* cited by examiner

*Primary Examiner* — Shahbaz Nazrul
(74) *Attorney, Agent, or Firm* — Fitzpatrick, Cella, Harper & Scinto

(57) ABSTRACT

Provided is a solid-state imaging apparatus, including amplifier units including: an amplifier having a first input terminal, a second input terminal, and an output terminal; an input capacitor having one terminal to which an output signal from a pixel is input, and another terminal connected to the second input terminal of the amplifier; a feedback switch connected between the second input terminal and the output terminal of the amplifier; and a feedback capacitor connected in parallel with the feedback switch and between the second input terminal and the output terminal of the amplifier, in which a driving current of the amplifier during a first period is smaller than a driving current of the amplifier during a second period in which the amplifier amplifies the output signal from the pixel, and the feedback switch is set to a connection state during the first period.

8 Claims, 12 Drawing Sheets

SOLID-STATE IMAGING APPARATUS AND IMAGING SYSTEM

BACKGROUND OF THE INVENTION

1. Field of the Invention

The present invention relates to a solid-state imaging apparatus and an imaging system.

2. Description of the Related Art

In Japanese Patent Application Laid-Open No. 2005-143078, there is disclosed a solid-state imaging apparatus having a configuration in which charge integrating amplifiers are arranged for respective columns of a pixel array including pixels arranged in matrix. The charge integrating amplifier of Japanese Patent Application Laid-Open No. 2005-143078 is set to a standby state while holding an image signal read out during a horizontal blanking period. When the signal is transferred to a horizontal signal line thereafter, among the plurality of charge integrating amplifiers, only the charge integrating amplifier for carrying out transfer is restored to a normal operation state from the standby state. In this manner, reduction in power consumption of the solid-state imaging apparatus is realized, which is described in Japanese Patent Application Laid-Open No. 2005-143078.

SUMMARY OF THE INVENTION

According to one embodiment of the present invention, there is provided a solid-state imaging apparatus including: a plurality of pixels constituting a pixel array including a plurality of pixel columns; and a plurality of amplifier units arranged respectively corresponding to the plurality of pixel columns of the pixel array, and configured to amplify a signal from corresponding one of the plurality of pixel columns, the plurality of amplifier units including: an amplifier having a first input terminal, a second input terminal, and an output terminal; an input capacitor having one terminal to which an output signal from corresponding one of the plurality of pixels is input, and another terminal connected to the second input terminal of the amplifier; a feedback switch connected between the second input terminal and the output terminal of the amplifier; and a feedback capacitor connected in parallel with the feedback switch and between the second input terminal and the output terminal of the amplifier, in which a driving current of the amplifier during a first period is smaller than a driving current of the amplifier during a second period in which the amplifier amplifies the output signal from the corresponding one of the plurality of pixels, and the feedback switch is set to a connection state during the first period.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Like components are denoted by like reference symbols throughout the drawings, and descriptions of overlapping components are sometimes omitted.

First Embodiment

Figure 1:
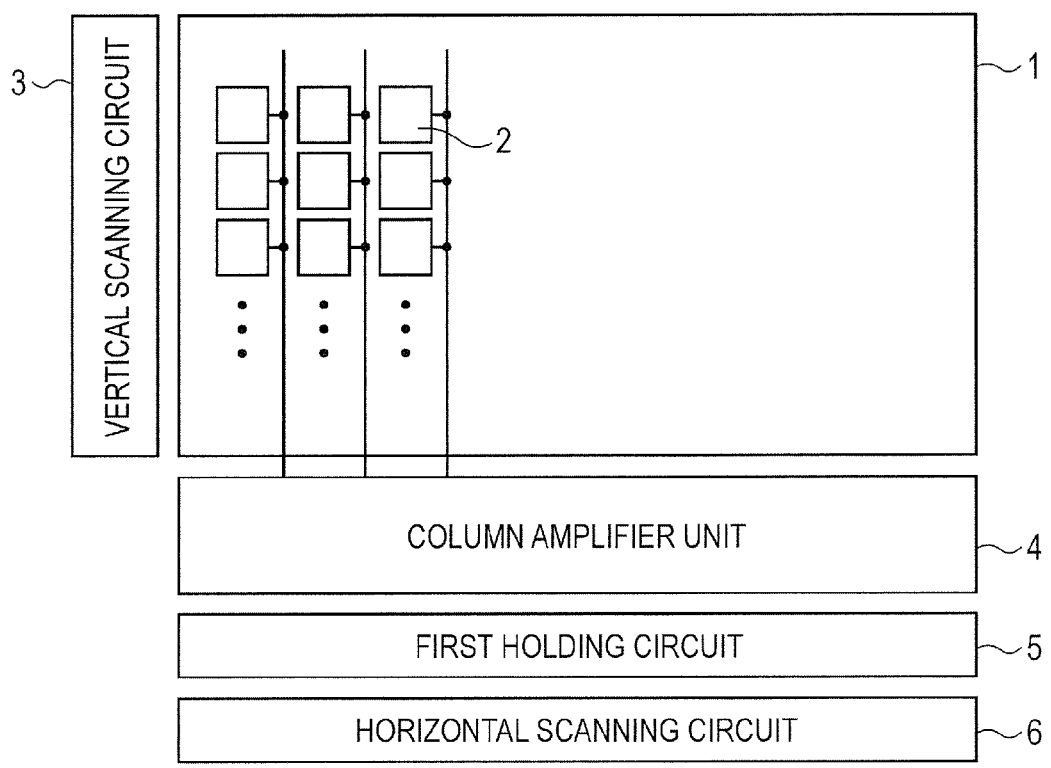
FIG. 1 is a block diagram for illustrating a configuration of a solid-state imaging apparatus according to a first embodiment of the present invention.

FIG. 1 is a block diagram for illustrating a configuration of a solid-state imaging apparatus according to a first embodiment of the present invention. The solid-state imaging apparatus includes a pixel array 1, a vertical scanning circuit 3, a column amplifier unit 4, a first holding circuit 5, and a horizontal scanning circuit 6. The pixel array 1 includes a plurality of pixels 2 two-dimensionally arranged in matrix. The pixel 2 includes a photoelectric conversion element configured to generate charges in accordance with the intensity of irradiated light, and a transistor circuit configured to convert the charges generated in the photoelectric conversion element into a voltage signal to output the voltage signal. The pixel 2 is configured to output two types of signals, that is, an image signal with a voltage corresponding to the intensity of irradiated light, and a reset signal with a voltage corresponding to a noise generated in the pixel 2 during reset or the like.

The vertical scanning circuit 3 is connected to the pixels 2 of the pixel array 1 via wiring for each row, and outputs a control signal for selecting the row to read out the signal output from the pixel 2. The column amplifier unit 4 is connected to the pixels 2 of the pixel array 1 via wiring for each column, and amplifies the output signal from the pixel 2 to output the amplified signal to the first holding circuit 5. The first holding circuit 5 is a circuit configured to temporarily hold the signal input from the column amplifier unit 4 in a capacitor. The horizontal scanning circuit 6 outputs a control signal for selecting a column to output the signal to the first holding circuit 5 for each column.

Figure 2:
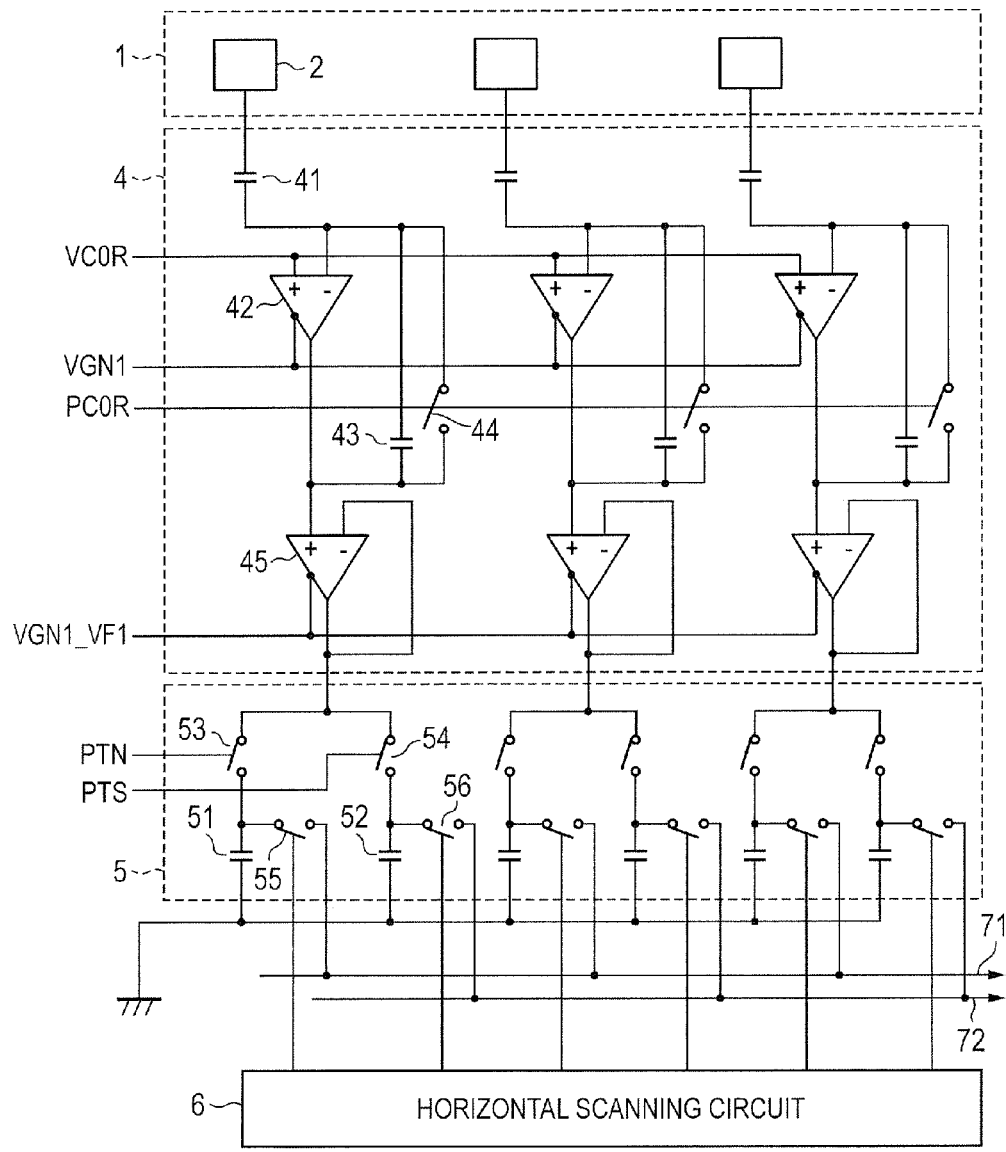
FIG. 2 is a circuit diagram of a column amplifier unit and a holding circuit of the first embodiment.

FIG. 2 is a circuit diagram for illustrating the column amplifier unit 4 and the first holding circuit 5 of the first embodiment in more detail. The column amplifier unit 4 includes input capacitors 41, operational amplifiers 42 and 45, feedback capacitors 43, and feedback switches 44. Note that, the "switch" herein refers to a circuit element that switches between on (connection state) and off (non-connection state) based on the control signal, and may be configured of a transistor, for example.

The operational amplifier 42 includes a non-inverting input terminal, an inverting input terminal, and an output terminal. A reference voltage VC0R is input to the non-inverting input terminal of the operational amplifier 42. The image signal or the reset signal output from the pixel 2 of the pixel array 1 is input to the inverting input terminal of the operational amplifier 42 via the input capacitor 41. Between the inverting input terminal and the output terminal of the operational amplifier 42, the feedback switch 44 is connected. The on or off state of the feedback switch 44 is controlled by a signal PC0R. Between the inverting input terminal and the output terminal of the operational amplifier 42, the feedback capacitor 43 is further connected, and the feedback capacitor 43 and the feedback switch 44 have a parallel connection relationship. The gain of the column amplifier unit 4 is determined depending on the ratio between the capacitance values of the input capacitor 41 and the feedback capacitor 43.

The operational amplifier 42 further includes a terminal to which a signal VGN1 is input. The signal VGN1 is a voltage signal for controlling a current to be caused to flow through the operational amplifier 42. By changing the voltage of the signal VGN1, the current amount that the operational amplifier 42 can output and the power consumption of the operational amplifier 42 can be changed.

The output signal of the operational amplifier 42 is input to a non-inverting input terminal of the operational amplifier 45. An inverting input terminal of the operational amplifier 45 is connected to an output terminal thereof. Therefore, the operational amplifier 45 constitutes a voltage follower circuit configured to output a voltage corresponding to the output voltage of the operational amplifier 42. The output terminal of the operational amplifier 45 is connected to the first holding circuit 5. The voltage follower circuit including the operational amplifier 45 has a function of supplying a current when a capacitor in the first holding circuit 5 is caused to hold a voltage. The operational amplifier 45 may be omitted. However, particularly when the gain of the operational amplifier 42 is high, it is necessary to supply a large current to the first holding circuit 5, and hence the configuration of this embodiment including the voltage follower including operational amplifier 45 is more suitable.

The operational amplifier 45 includes a terminal to which a signal VGN1_VF1 is input. Similarly to the operational amplifier 42, the voltage of the signal VGN1_VF1 is changed so that the current amount that the operational amplifier 45 can output and the power consumption of the operational amplifier 45 can be changed.

In this embodiment, the voltage follower circuit including the operational amplifier 45 is connected to the output stage of the operational amplifier 42, but the present invention is not limited thereto. As described above, the operational amplifier 45 is only required to be a buffer circuit for supplying a current to the first holding circuit 5 at the output stage, and may be replaced with a circuit element other than the voltage follower using the operational amplifier 45. Further, the voltage amplification factor of the buffer circuit may be substantially 1 as in the voltage follower circuit exemplified in this embodiment, or may be other values.

The first holding circuit 5 includes holding capacitors 51 and 52 and switches 53, 54, 55, and 56. The switches 53 and 54 are controlled to be turned on or off by signals PTN and PTS, respectively. The switches 55 and 56 are controlled to be turned on or off by the control signals from the horizontal scanning circuit 6. One terminal of each of the switches 53 and 54 is connected to the output terminal of the operational amplifier 45. The other terminal of the switch 53 is connected to one terminal of the holding capacitor 51 and one terminal of the switch 55. The other terminal of the holding capacitor 51 is connected to the ground. The other terminal of the switch 55 is connected to a horizontal signal line 71. The other terminal of the switch 54 is connected to one terminal of the holding capacitor 52 and one terminal of the switch 56. The other terminal of the holding capacitor 52 is connected to the ground. The other terminal of the switch 56 is connected to a horizontal signal line 72.

When the switch 53 is turned on by the signal PTN, the reset signal voltage is held in the holding capacitor 51. When the switch 54 is next turned on by the signal PTS, the image signal voltage is held in the holding capacitor 52. After that, when the switches 55 and 56 are turned on by the control signals from the horizontal scanning circuit 6, the reset signal and the image signal held in the holding capacitors 51 and 52 are output to the horizontal signal lines 71 and 72, respectively.

The solid-state imaging apparatus of this embodiment can operate in a power saving mode for reducing the power consumption. In the power saving mode, the currents to be supplied to the operational amplifiers 42 and 45 have values smaller than the current during the signal read-out and within a range in which the operational amplifiers 42 and 45 are not turned off. By controlling the currents (driving currents) to be caused to flow through the operational amplifiers 42 and 45 with the signals VGN1 and VGN1_VF1, the transition from the normal mode to the power saving mode and the transition from the power saving mode to the normal mode are carried out.

Figure 3:
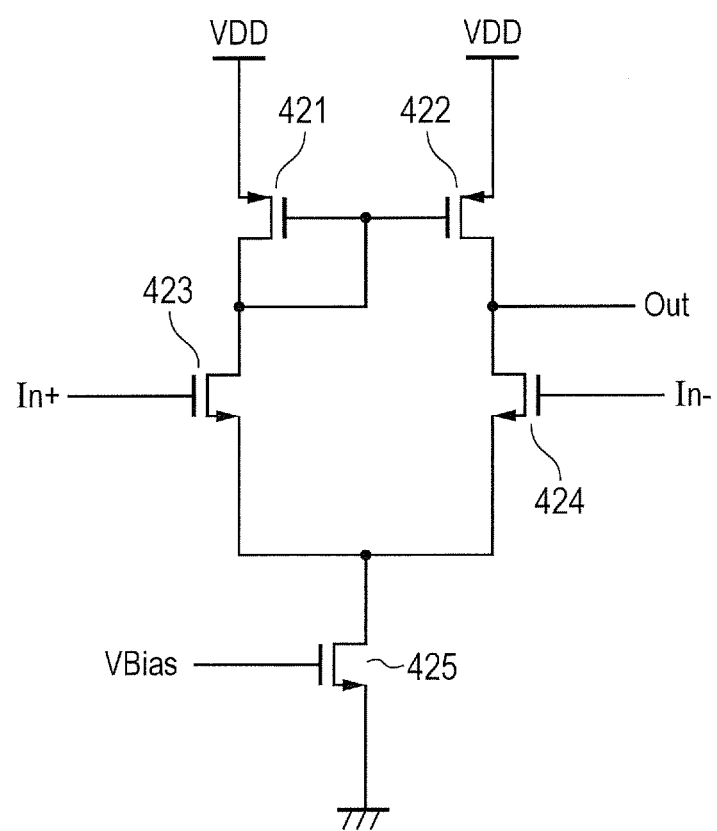
FIG. 3 is a circuit diagram of an operational amplifier of the first embodiment.

FIG. 3 is a circuit diagram for illustrating the internal circuit of the operational amplifier 42. The operational amplifier 42 constitutes a single-stage differential amplifier circuit. The operational amplifier 42 includes, as input/output terminals, a non-inverting input terminal In+, an inverting input terminal In−, an output terminal Out, and a driving current bias terminal VBias. The operational amplifier 42 includes transistors 421, 422, 423, 424, and 425. The transistors 421 and 422 are each configured as a P-channel metal-oxide-semiconductor field effect transistor (MOSFET). The transistors 423, 424, and 425 are each configured as an N-channel MOSFET.

A power supply voltage VDD is input to a source terminal of each of the transistors 421 and 422. Gate terminals of the transistors 421 and 422 are shared and connected to a drain terminal of the transistor 421. Drain terminals of the transistors 421 and 422 are connected to drain terminals of the transistors 423 and 424, respectively. Further, the drain terminal of the transistor 424 forms the output terminal Out. Gate terminals of the transistors 423 and 424 form the non-inverting input terminal In+ and the inverting input terminal In−, respectively. Source terminals of the transistors 423 and 424 are shared and connected to a drain terminal of the transistor 425. A gate terminal of the transistor 425 forms the driving current bias terminal VBias. A source terminal of the transistor 425 is connected to the ground.

The signal VGN1 is input to the driving current bias terminal VBias. Depending on the voltage of the signal VGN1, the value of the current that flows through the operational amplifier 42 is determined. In the power saving mode, the voltage value of the signal VGN1 is a value smaller than that during the signal read-out and within a range in which the operational amplifier 42 is not turned off. Note that, the internal circuit of the operational amplifier 45 can be constituted by using a similar circuit, and hence description thereof is omitted herein.

Figure 4:
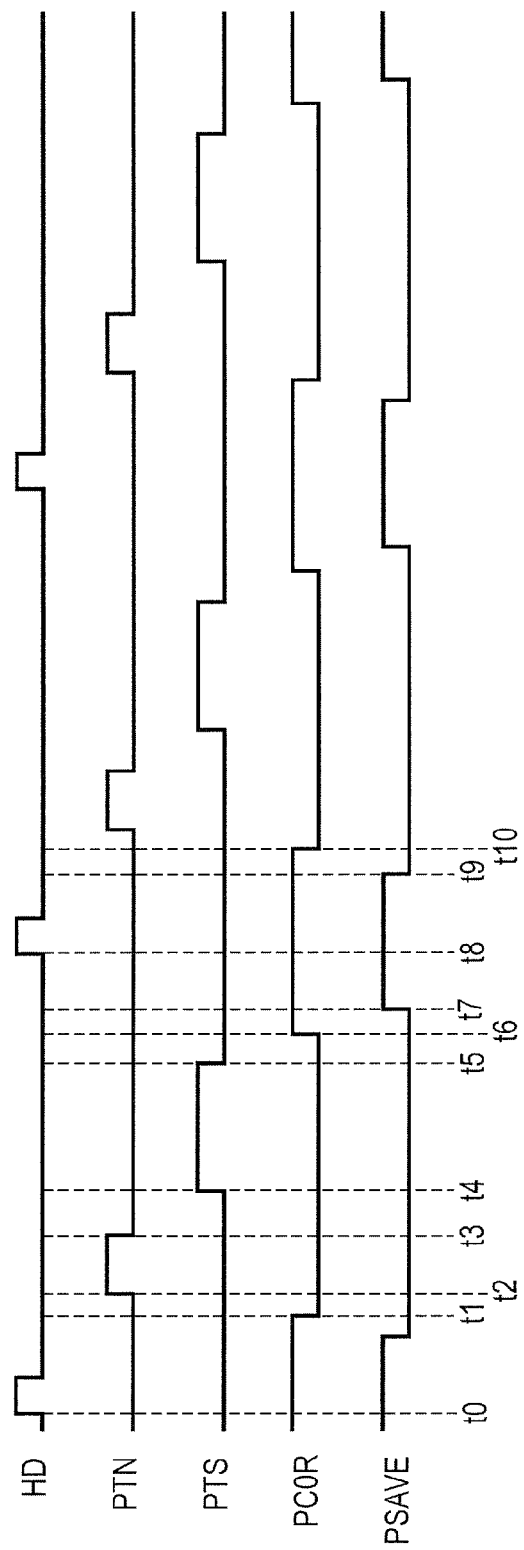
FIG. 4 is a timing chart for illustrating an operation of the first embodiment.

FIG. 4 is a timing chart for illustrating the operation of the solid-state imaging apparatus of the first embodiment. FIG. 4 is an illustration of the operation timing of signals HD, PTN, PTS, PC0R, and PSAVE when three rows of the pixel array 1 are read out. Note that, it is supposed that every switch to be operated by each signal is turned on when the voltage level of the signal is High, and turned off when the voltage level of the signal is Low. The signal HD is a signal for controlling the timing to start read-out of one row. The signal PSAVE is a signal for changing the voltages of the signals VGN1 and VGN1_VF1 to switch the power saving mode and the normal read-out state. When the signal PSAVE is Low, the signals VGN1 and VGN1_VF1 are in a high voltage state, and the solid-state imaging apparatus is set to the normal read-out state. Further, when the signal PSAVE is High, the signals VGN1 and VGN1_VF1 are in a low voltage state. Thus, the currents (driving currents) to be caused to flow through the operational amplifiers 42 and 45 are reduced, and the solid-state imaging apparatus is set to the power saving mode.

At times t0 and t8, the signal HD is set to High. When the signal HD is set to High, the read-out of the designated row is started, and hence a period between the times t0 and t8 corresponds to a read-out period for one row.

At the time t0, the signals PTN and PTS are set to Low, and the signal PC0R is set to High. Therefore, the switches 53 and 54 are turned off, and the feedback switch 44 is turned on. That is, at the point of the time t0, the column amplifier unit 4 is in a reset state.

At time t1, the signal PC0R is switched from High to Low, and thus the feedback switch 44 is turned off. With this, the reset of the column amplifier unit 4 is ended.

During a period between times t2 and t5, the reset signal and the image signal are read out from the pixel 2. At the time t2, the signal PTN is set to High, and thus the switch 53 is turned on, to thereby hold the reset signal voltage in the holding capacitor 51. At time t3, the signal PTN is set to Low, and thus the switch 53 is turned off. Next, at time t4, the signal PTS is set to High, and thus the switch 54 is turned on, to thereby hold the image signal voltage in the holding capacitor 52. At the time t5, the signal PTS is set to Low, and thus the switch 54 is turned off. With this operation, the reset signal and the image signal are read out from the pixel 2, and are held in the holding capacitors 51 and 52, respectively.

During a period between times t6 and t10, the switches 55 and 56 of each column are sequentially turned on by the control signals from the horizontal scanning circuit 6. With this, the pixel column is sequentially selected, and the reset signal and the image signal of each column are sequentially output to the horizontal signal lines 71 and 72. During this period, the operational amplifiers 42 and 45 of the column amplifier unit 4 are not used. Therefore, by setting the column amplifier unit 4 to the power saving mode, power consumption of the operational amplifiers 42 and 45 can be reduced.

At the time t6, the signal PC0R is set to High, and thus the feedback switch 44 is turned on. With this, the inverting input terminal and the output terminal of the operational amplifier 45 are connected to each other, and the column amplifier unit 4 is reset. At time t7, the signal PSAVE is set to High, and thus the column amplifier unit 4 is set to the power saving mode. At time t8, the signal HD is set to High, and thus the next row is selected. It is necessary to restore the column amplifier unit 4 to the normal read-out state for read-out of the next row. Therefore, at time t9, the signal PSAVE is set to Low, and thus the power saving mode is ended. At the time t10, the signal PC0R is set to Low. Thus, the reset of the column amplifier unit 4 is ended, and the feedback switch 44 is turned off.

In the configuration of the solid-state imaging apparatus disclosed in Japanese Patent Application Laid-Open No. 2005-143078, when the charge integrating amplifier is set to the standby state (power saving mode), the voltage at each node of the charge integrating amplifier is indeterminate, and hence the voltage at each node becomes a voltage close to the ground voltage or the power supply voltage due to the leakage current or the like. Therefore, when the charge integrating amplifier is restored to the activation state, a charge/discharge time period for change from the ground voltage or the power supply voltage to the reset voltage is necessary. From such a reason, in the above-mentioned solid-state imaging apparatus, a restoring time period required for the charge integrating amplifier to restore to the normal state from the standby state is long. In contrast, in the configuration of this embodiment, during the period of the power saving mode, the feedback switch of the column amplifier is turned on so that the operational amplifier 42 has the configuration of the voltage follower. With this, the voltages of all terminals of the operational amplifier 42 are set to a voltage close to the reference voltage VC0R. That is, during the period of the power saving mode, the voltages of the input/output terminals of the operational amplifier 42 are fixed to a constant value close to the reference voltage VC0R. Therefore, a charge/discharge time period required for the operational amplifier 42 to restore to the normal read-out state from the power saving mode is reduced. Note that, the operational amplifier 45 also has the configuration of the voltage follower, and hence the charge/discharge time period is similarly reduced. Therefore, according to the configuration of this embodiment, in the solid-state imaging apparatus capable of operating in the power saving mode for reducing the power consumption of the column amplifier unit, the time period of restoring to the normal mode from the power saving mode can be reduced.

Second Embodiment

Figure 5:
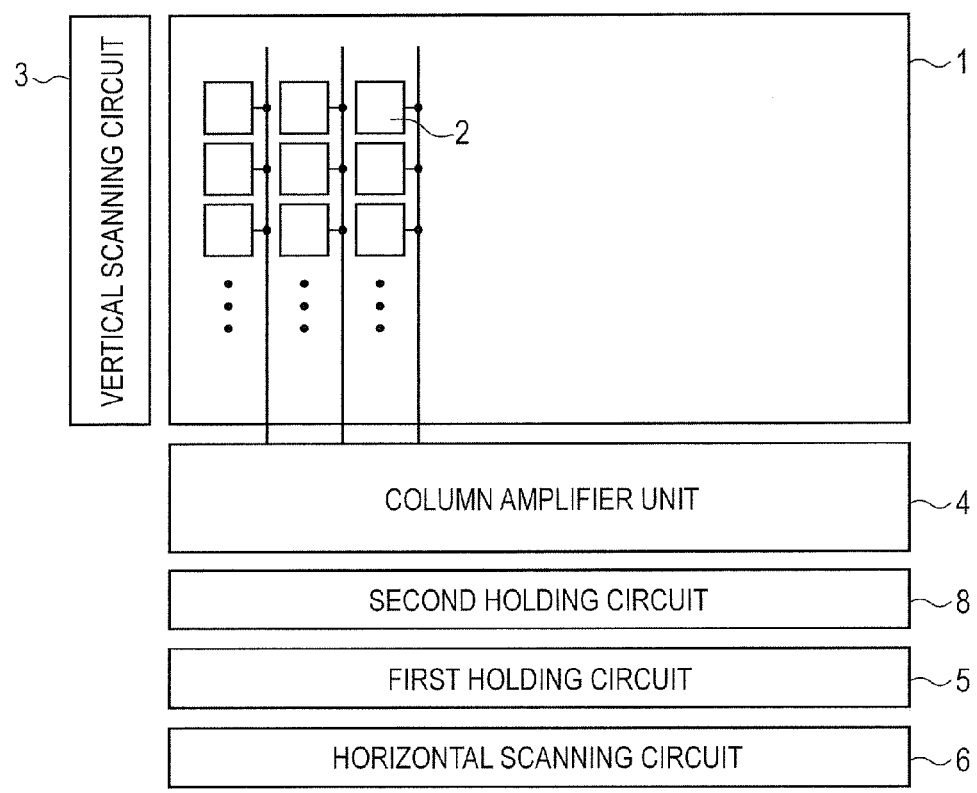
FIG. 5 is a block diagram for illustrating a configuration of a solid-state imaging apparatus according to a second embodiment of the present invention.

FIG. 5 is a block diagram for illustrating a configuration of a solid-state imaging apparatus according to a second embodiment of the present invention. The solid-state imaging apparatus of the second embodiment further includes a second holding circuit 8 in addition to the configuration of the first embodiment. The second holding circuit 8 is connected between the column amplifier unit 4 and the first holding circuit 5 that have already been described as the first embodiment. The second holding circuit 8 has a function of holding a signal of the next row, which is read out in parallel, during the horizontal transfer period of outputting the signals from the first holding circuit 5 to the horizontal signal lines 71 and 72.

Figure 6:
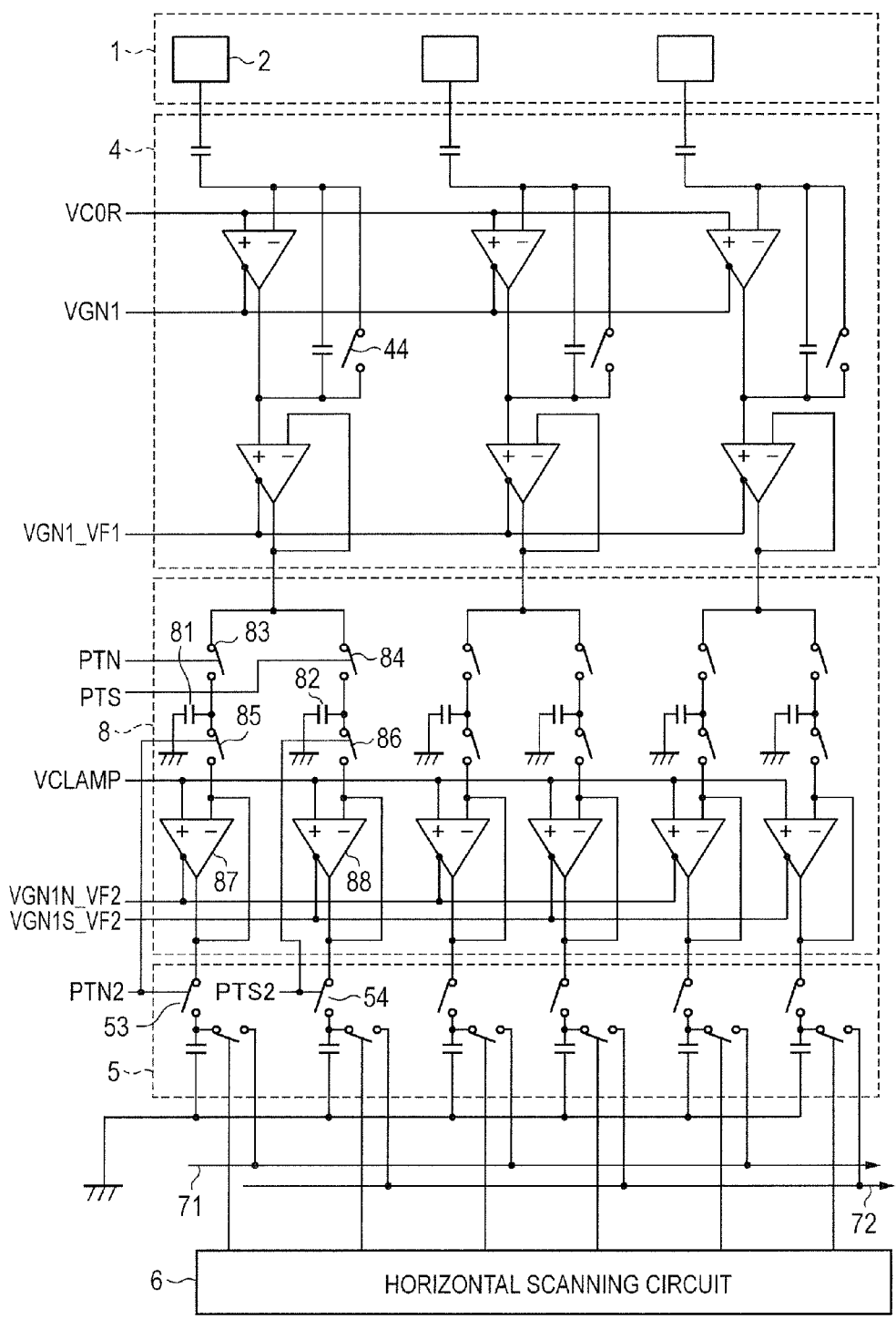
FIG. 6 is a circuit diagram of a column amplifier unit and a holding circuit of the second embodiment.

FIG. 6 is a circuit diagram of the column amplifier unit 4, the first holding circuit 5, and the second holding circuit 8 of the second embodiment. The second holding circuit 8 includes holding capacitors 81 and 82, switches 83, 84, 85, and 86, and operational amplifiers 87 and 88. The holding capacitor 81, the switches 83 and 85, and the operational amplifier 87 constitute a circuit for holding the reset signal. The holding capacitor 82, the switches 84 and 86, and the operational amplifier 88 constitute a circuit for holding the image signal.

One terminal of the switch 83 is connected to the output of the column amplifier unit 4. The other terminal of the switch 83 is connected to one terminal of the holding capacitor 81 for holding the reset signal and one terminal of the switch 85. The other terminal of the holding capacitor 81 is connected to the ground. The other terminal of the switch 85 is connected to an inverting input terminal of the operational amplifier 87. A reference voltage VCLAMP is input to a non-inverting input terminal of the operational amplifier 87. An inverting input terminal and an output terminal of the operational amplifier 87 are connected to each other via wiring, to thereby constitute a voltage follower circuit. Similarly to the operational amplifiers 42 and 45, a signal VGN1N_VF2 is input to a VBias terminal, to thereby control a current to be caused to flow through the operational amplifier 87. As described above, the circuit for holding the reset signal is constituted. Note that, the voltage follower circuit to be constituted of the operational amplifier 87 is merely an example, and the present invention is not limited to this configuration. The function as the buffer circuit is only required similarly to the operational amplifier 45.

The circuit for holding the image signal constituted of the holding capacitor 82, the switches 84 and 86, and the operational amplifier 88 has a configuration similar to that of the circuit for the reset signal, and hence the description thereof is omitted herein. The current to be caused to flow through the operational amplifier 88 is controlled by a signal VGN1S_VF2.

As described above, the currents to be caused to flow through the operational amplifiers 87 and 88 can be controlled. In the power saving mode, the voltage values of the signals VGN1N_VF2 and VGN1S_VF2 are decreased as compared to those during the signal read-out. In this manner, the currents to be caused to flow through the operational amplifiers 87 and 88 are decreased, and thus the power consumption is reduced.

Note that, the switches 83 and 84 are controlled by the signals PTN and PTS, respectively. Further, both of the switches 85 and 53 are controlled by a signal PTN2, and both of the switches 86 and 54 are controlled by a signal PTS2. Other control signals are similar to those in the first embodiment.

Figure 7:
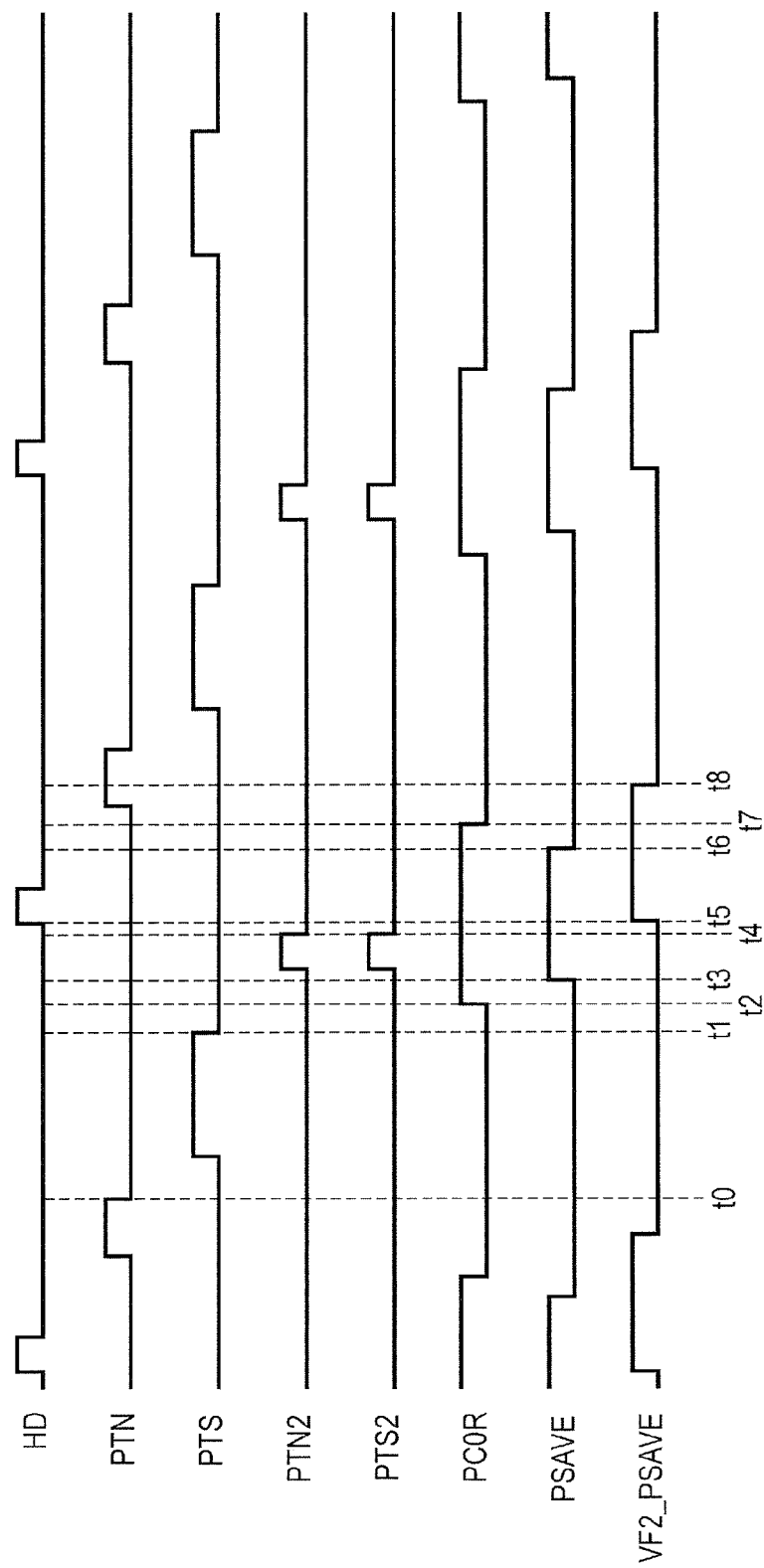
FIG. 7 is a timing chart for illustrating an operation of the second embodiment.

FIG. 7 is a timing chart for illustrating the operation of the solid-state imaging apparatus of the second embodiment. FIG. 7 is an illustration of the operation timing of signals HD, PTN, PTS, PTN2, PTS2, PC0R, PSAVE, and VF2_PSAVE. The signal VF2_PSAVE is a signal for switching the power saving mode and the normal read-out state of the operational amplifiers 87 and 88 of the second holding circuit 8. Now, the operation of the second embodiment is described with reference to FIG. 7. In the following, description of the same operation as the first embodiment may be omitted.

At the time t0, the signal PTN is switched from High to Low, and thus the reset signal voltage is held in the holding capacitor 81. At the time t1, the signal PTS is switched from High to Low, and thus the pixel signal voltage is held in the holding capacitor 82.

At the time t2, the signal PC0R is set to High, and thus the feedback switch 44 of the column amplifier unit 4 is turned on. At the time t3, the signal PSAVE is set to High, and thus the column amplifier unit 4 is set to the power saving mode.

At the time t4, the signals PTN2 and PTS2 are switched from High to Low, and thus the transfer of the signals from the second holding circuit 8 to the first holding circuit 5 is ended. After that, at the time t5, the signal VF2_PSAVE is set to High, and thus the operational amplifiers 87 and 88 of the second holding circuit 8 are set to the power saving mode.

At the time 6, the signal PSAVE is set to Low, and thus the power saving mode of the column amplifier unit 4 is cancelled. At the time t7, the signal PC0R is set to Low, and thus the feedback switch 44 of the column amplifier unit 4 is turned off. At the time t8, the signal VF2_PSAVE is set to Low, and thus the power saving mode of the operational amplifiers 87 and 88 of the second holding circuit 8 is cancelled.

As described above, during the period from the time t1, the operation of the column amplifier unit 4, which includes signal output from the second holding circuit 8 to the first holding circuit 5, a pixel reset operation, and the like, is unnecessary. Therefore, the column amplifier unit 4 is set to the power saving mode during the period between the times t3 and t6 after the pixel signal voltage is held in the second holding circuit 8. At this time, the feedback switch 44 is turned on at the time t2 before the power saving mode is set, and is turned off at the time t6 after the power saving mode is cancelled. Thus, similarly to the first embodiment, during the period of the power saving mode, the voltages of the input/output terminals of the operational amplifier 42 are fixed to a constant value close to the reference voltage VC0R, and the charge/discharge time period required for the solid-state imaging apparatus to restore to the normal read-out state from the power saving mode is reduced. That is, also in the configuration of this embodiment, similarly to the first embodiment, in the solid-state imaging apparatus capable of operating in the power saving mode for reducing the power consumption of the column amplifier unit, the time period of restoring to the normal mode from the power saving mode can be reduced.

Further, in this embodiment, after the writing from the second holding circuit 8 to the first holding circuit 5 is ended, a non-use state is maintained until a timing at which the reset signal voltage is next written to the holding capacitor 81. Therefore, the operational amplifiers 87 and 88 of the second holding circuit 8 are also set to the power saving mode during a period between the time t5 and the time t8. In this case, the operational amplifiers 87 and 88 each have a voltage follower configuration in which the inverting input terminal and the non-inverting input terminal are short-circuited. Therefore, the voltages of the input/output terminals of the operational amplifiers 87 and 88 are fixed to a constant value close to the reference voltage VCLAMP. Therefore, also in the second holding circuit 8, similarly to the first holding circuit 5, a charge/discharge time period required for the operational amplifier to restore to the normal read-out state from the power saving mode is reduced.

Third Embodiment

Figure 8:
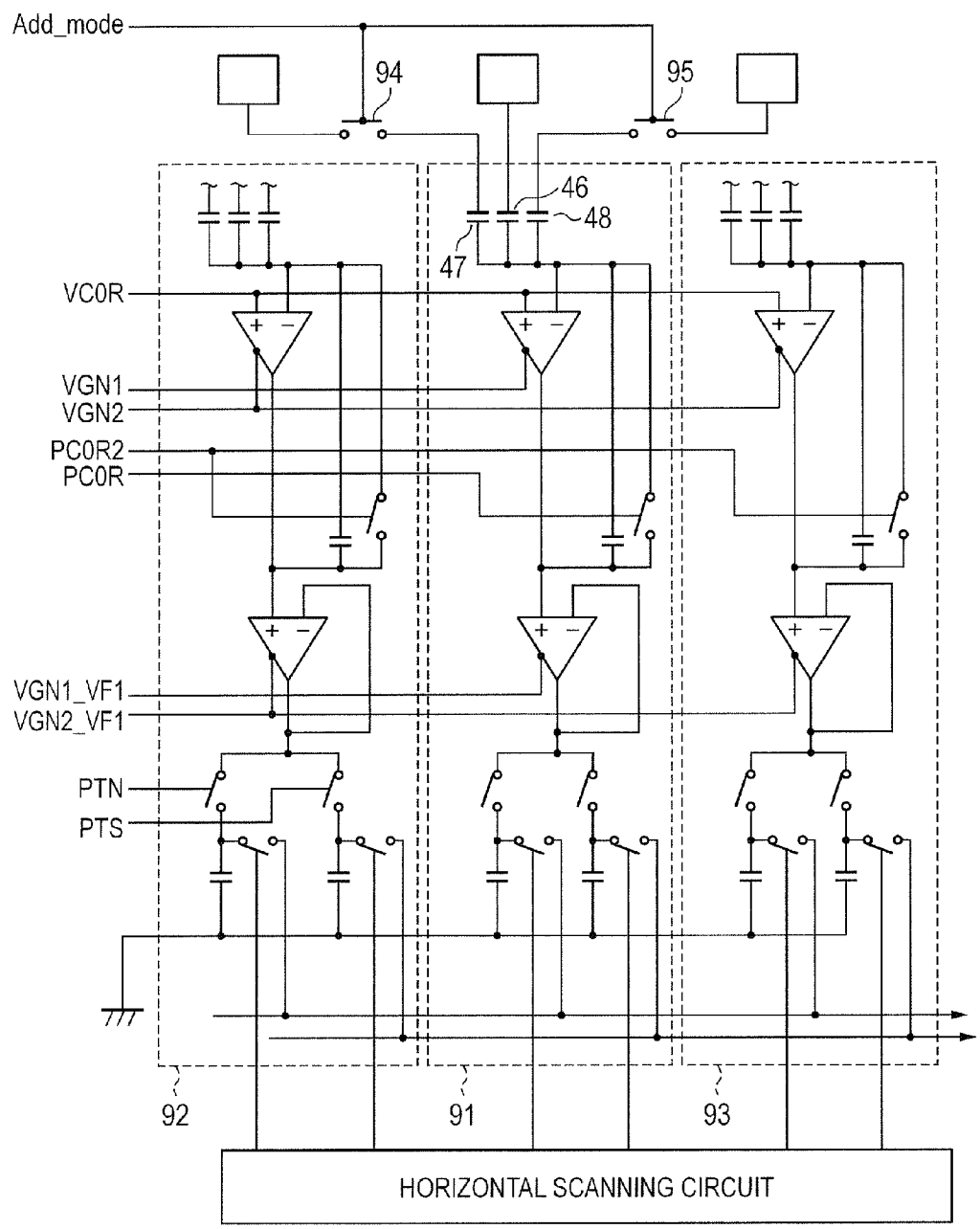
FIG. 8 is a circuit diagram of a column amplifier unit and a holding circuit according to a third embodiment of the present invention.

FIG. 8 is a circuit diagram of a solid-state imaging apparatus according to a third embodiment of the present invention. The solid-state imaging apparatus of this embodiment includes three input capacitors 46, 47, and 48 instead of the input capacitors 41, and also includes addition switches 94 and 95. Other configurations are similar to those in the circuit of the first embodiment of the present invention illustrated in FIG. 2. In this embodiment, a circuit formed across the column amplifier unit 4 and the first holding circuit 5 for one column corresponding to one pixel column of the pixel array 1 is called as a "column circuit". FIG. 8 is an illustration of column circuits 91, 92, and 93. The column circuit 92 is adjacently arranged on the left side of the column circuit arranged at the center, and the column circuit 93 is adjacently arranged on the right side thereof.

The input capacitor 46 is connected to the pixel in the center column. The input capacitor 47 is connected to one terminal of the addition switch 94, and the other terminal of the addition switch 94 is connected to the pixel in the left adjacent column. The input capacitor 48 is connected to one terminal of the addition switch 95, and the other terminal of the addition switch 95 is connected to the pixel in the right adjacent column. Note that, the same is true for the column circuits in other columns, and the input capacitors are respectively connected to the three pixels of a corresponding column and columns adjacent thereto.

When a signal Add_mode is set to High, the addition switches 94 and 95 are turned on, and thus pixel signals of three columns are respectively input to the input capacitors 46, 47, and 48 connected to the center column circuit 91. With this, the signals of the pixels of the three columns are added. Such a state that the signal Add_mode is set to High for addition is referred to as an "addition mode".

In the addition mode, it is necessary to operate the operational amplifiers in the center column circuit 91 to which the signals are input. However, signals are not input to the operational amplifiers in the left and right column circuits 92 and 93, and hence those operational amplifiers are not required to be operated. Therefore, in this embodiment, when the addition mode is used for the operation, the left and right column circuits 92 and 93 may be set to the power saving mode, to thereby realize power saving.

Note that, in this embodiment, the control signal for operating the feedback switch 44 is supplied to the center column and to the left and right columns by different signal lines. The control signal for controlling the feedback switch 44 of the center column circuit 91 is represented by a signal PC0R, and the control signal for controlling the feedback switches of the left and right column circuits 92 and 93 is represented by a signal PC0R2. Further, the signal for controlling the currents to be caused to flow through the operational amplifiers 42 and 45 is also supplied to the center column and to the left and right columns by different signal lines. In this manner, it is possible to operate the center column circuit 91 in the normal mode, and operate the left and right column circuits 92 and 93 in the power saving mode.

The control signals for the operational amplifiers 42 and 45 in the center column circuit 91 are respectively represented by signals VGN1 and VGN1_VF1, and the control signals for the operational amplifiers 42 and in the left and right column circuits 92 and 93 are respectively represented by signals VGN2 and VGN2_VF1. The signal for controlling the signals VGN2 and VGN2_VF1 to control switching between the normal mode and the power saving mode is represented by PSAVE2.

Figure 9:
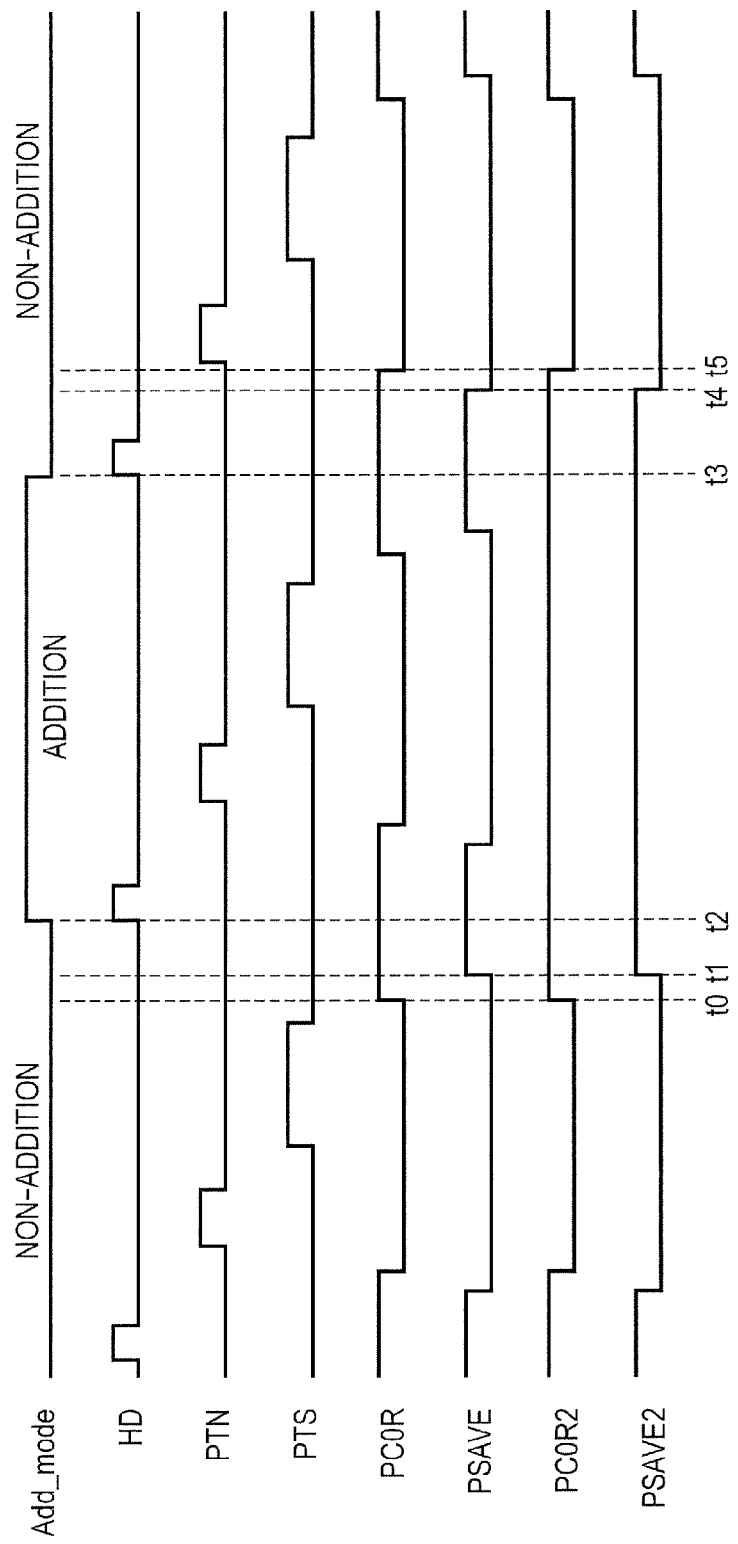
FIG. 9 is a timing chart for illustrating an operation of the third embodiment.

FIG. 9 is a timing chart for illustrating the operation of the solid-state imaging apparatus of the third embodiment. FIG. 9 is an illustration of the operation timing in a case where, in a certain column, the operation transitions from the non-addition mode to the addition mode, and then the operation returns to the non-addition mode again. The center column circuit 91 carries out the same operation in both cases of the addition mode and the non-addition mode, and hence the signals HD, PTN, PTS, PC0R, and PSAVE to be controlled are operated at the same timing as the first embodiment. The left and right column circuits 92 and 93 carry out the same operation as the center column circuit 91 during the non-addition mode, and are operated at the same timing as the first embodiment as well. Therefore, description of the operation of the cases described above is omitted herein.

On the other hand, the left and right column circuits 92 and 93 are operated differently from the first embodiment during the addition mode. At the time t0, the signal PC0R2 is set to High, and thus the feedback switch 44 is turned on. At the time t1, the signal PSAVE2 is set to High, and thus the operational amplifier 42 is set to the power saving mode. At the time t2, the signal Add_mode is set to High, and thus the addition mode is set.

At the time t3, the signal Add_mode is set to Low, and thus the operation returns to the non-addition mode. At the time t4, the signal PSAVE2 is set to Low, and thus the power saving mode of the column circuits 92 and 93 is cancelled. At the time t5, the signal PC0R2 is set to Low, and thus the feedback switch 44 is turned off.

As described above, in the column circuits 92 and 93, the feedback switch 44 is turned on during a period from the time t0 before the power saving mode is set to the time t5 after the power saving mode is cancelled. With this, similarly to the first embodiment, the voltages of the input/output terminals of the operational amplifier 42 are fixed to a constant value close to the reference voltage VC0R. Therefore, also in the solid-state imaging apparatus that operates in the addition mode for adding the signals of a plurality of columns, a charge/discharge time period required for the column circuits 92 and 93, which are unused during the addition, to restore to the normal read-out state from the power saving mode is reduced. That is, also in the configuration of this embodiment, similarly to the first embodiment, in the solid-state imaging apparatus capable of operating in the power saving mode for reducing the power consumption of the column amplifier unit, the time period of restoring to the normal mode from the power saving mode can be reduced.

Fourth Embodiment

Figure 10:
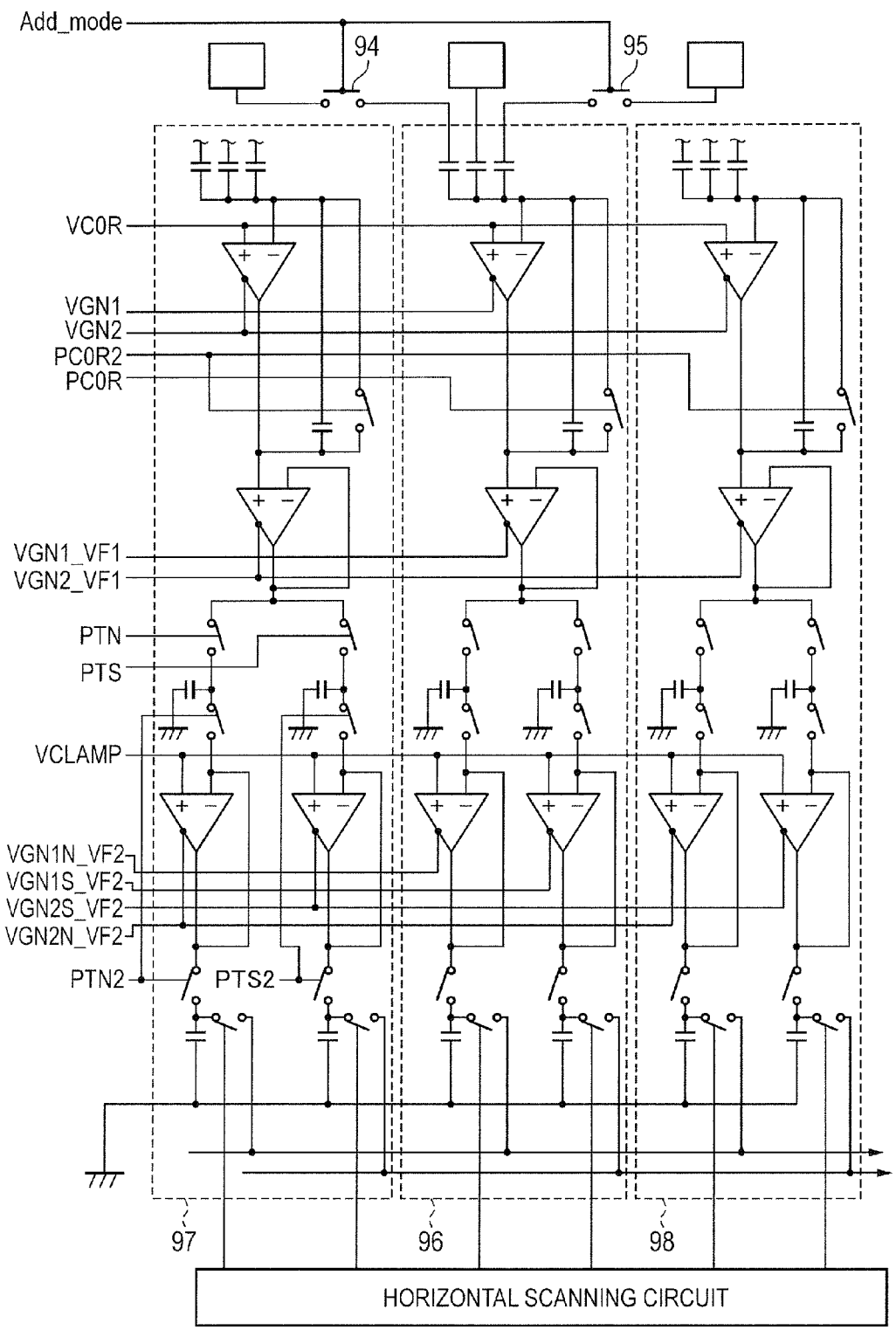
FIG. 10 is a circuit diagram of a column amplifier unit and a holding circuit according to a fourth embodiment of the present invention.

FIG. 10 is a circuit diagram of a solid-state imaging apparatus according to a fourth embodiment of the present invention. The solid-state imaging apparatus of this embodiment is obtained by modifying the circuit of the second embodiment into the configuration including the three input capacitors and the addition switches 94 and 95 so as to enable an operation in an addition mode similar to that in the third embodiment. Similarly to the third embodiment, column circuits 97 and 98 are arranged on the left and right sides of a center column circuit 96. When the signal Add_mode is set to High, signals of three columns are input to the column circuit 96, and the signals are added. At this time, the left and right column circuits 97 and 98 may be set to the power saving mode, to thereby realize power saving. Note that, in this embodiment, a circuit formed across the column amplifier unit 4, the first holding circuit 5, and the second holding circuit 8 for one column corresponding to one pixel column of the pixel array 1 is called as a "column circuit".

Note that, the control signals for the operational amplifiers 87 and 88 in the center column circuit 96 are respectively represented by signals VGN1N_VF2 and VGN1S_VF2, and the control signals for the operational amplifiers 87 and 88 in the left and right column circuits 97 and 98 are respectively represented by signals VGN2N_VF2 and VGN2S_VF2. The signal for controlling the signals VGN2N_VF2 and VGN2S_VF2 to control switching between the normal mode and the power saving mode is represented by VF2_PSAVE2.

Figure 11:
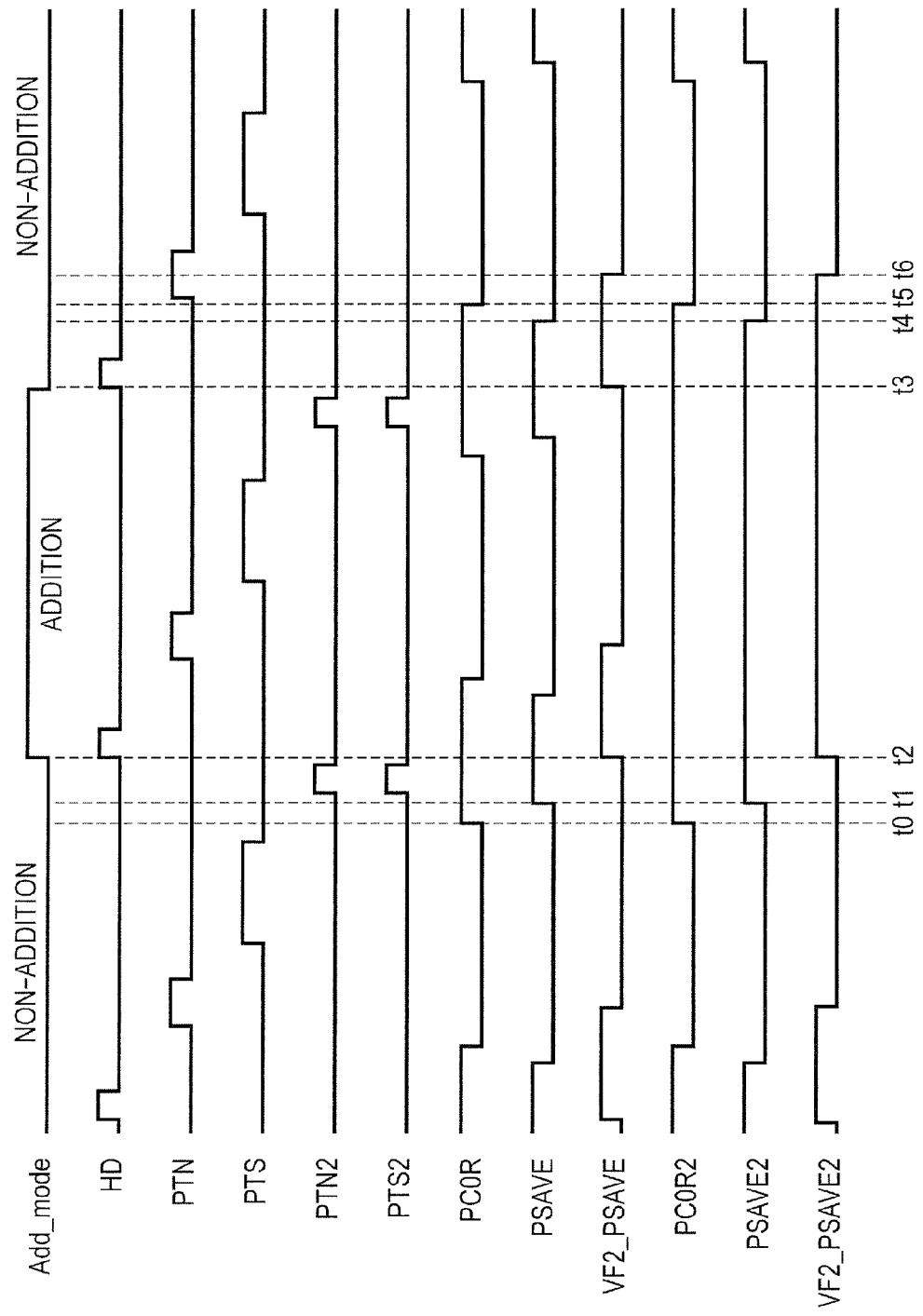
FIG. 11 is a timing chart for illustrating an operation of the fourth embodiment.

FIG. 11 is a timing chart for illustrating the operation of the solid-state imaging apparatus of the fourth embodiment. The operation of the center column circuit 96 is the same as that in the second embodiment. That is, the signals HD, PTN, PTS, PTN2, PTS2, PC0R, PSAVE, and VF2_PSAVE are operated similarly to the timing chart illustrated in FIG. 7. Further, also in the left and right column circuits 97 and 98, the signals relating to components other than the second holding circuit 8 are operated at similar timings. Description of those signals is omitted herein.

At the time t2, the signal Add_mode is set to High, and thus the addition mode is set. At this time, the transfer of the signals from the second holding circuit 8 to the first holding circuit 5 is already ended, and hence the operational amplifiers 87 and 88 are unused. Therefore, at the time t2, the signal VF2_PSAVE2 is set to High, and thus the operational amplifiers 87 and 88 are set to the power saving mode. After that, at the time t6, the signal VF2_PSAVE2 is set to Low, and thus the power saving mode of the operational amplifiers 87 and 88 is cancelled.

Also in this embodiment, similarly to the first to third embodiments, the charge/discharge time period required for the operational amplifier to restore to the normal read-out state from the power saving mode is reduced. That is, similarly to the first embodiment, in the solid-state imaging apparatus capable of operating in the power saving mode for reducing the power consumption of the column amplifier unit, the time period of restoring to the normal mode from the power saving mode can be reduced.

In this embodiment, the addition or the like is carried out so as not to read out a part of columns. Thus, it is possible to skip reading of some columns to reduce the number of columns to be read out. When the vertical scanning circuit 3 vertically scans the pixel array 1, it is possible to change the number of columns to be subjected to the read-out for each vertical scanning period. At this time, the column circuit to be subjected to the read-out is operated as normal, and the column circuit not to be subjected to the read-out is not operated. In this driving method, the feedback switch 44 of the non-operating column circuit is turned on and the power saving mode is set. With this, the power consumption of the column circuit not to be subjected to the read-out is reduced, and the time period of restoring the operation from the power saving mode is reduced.

Note that, in the third and fourth embodiments, a configuration enabling addition of three columns is exemplified, but the number of columns to be added is not limited thereto. A configuration in which a non-operating column is present is only required. That is, the number of columns to be added may be 2, or a plurality of columns such as four columns or more may be added.

Fifth Embodiment

Figure 12:
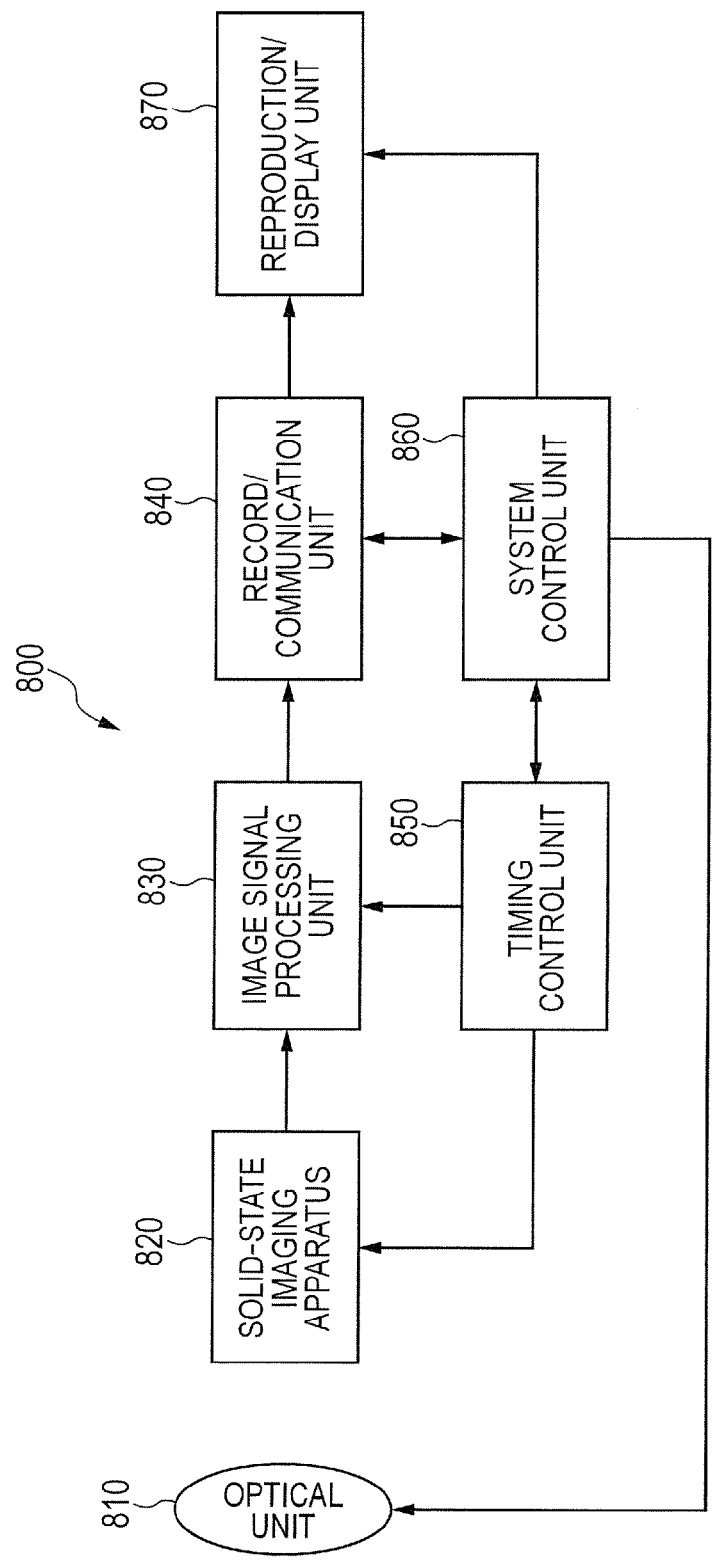
FIG. 12 is a block diagram for illustrating a configuration of an imaging system according to a fifth embodiment of the present invention.

FIG. 12 is a diagram for illustrating a configuration of an imaging system according to a fifth embodiment of the present invention. An imaging system 800 includes an optical unit 810, a solid-state imaging apparatus 820, an image signal processing unit 830, a record/communication unit 840, a timing control unit 850, a system control unit 860, and a reproduction/display unit 870. The solid-state imaging apparatus 820 is a solid-state imaging apparatus having the configuration illustrated in any one of the first to fourth embodiments. The optical unit 810, which is an optical system such as a lens, causes light from an object to image on the pixel array 1 including the plurality of two-dimensionally arrayed pixels 2 of the solid-state imaging apparatus 820, to thereby form an object image.

The solid-state imaging apparatus 820 outputs, at a timing based on a signal from the timing control unit 850, a signal corresponding to the light imaged on the pixel array 1. The signal output from the solid-state imaging apparatus 820 is subjected to processing such as AD conversion, and is then input to the image signal processing unit 830. The image signal processing unit 830 carries out signal processing, such as conversion of the input signal into image data, based on a method determined by a program or the like. The signal obtained by the processing in the image signal processing unit 830 is transmitted to the record/communication unit 840 as the image data. The record/communication unit 840 transmits a signal for forming an image to the reproduction/display unit 870, and causes the reproduction/display unit 870 to reproduce and display a moving image or a still image. The record/communication unit 840 further receives a signal from the image signal processing unit 830, to thereby carry out communication with the system control unit 860, and in addition, carry out an operation of recording the signal for forming the image in a recording medium (not shown).

The system control unit 860 carries out centralized control of the operation of the imaging system 800, and controls the drive of the optical unit 810, the timing control unit 850, the record/communication unit 840, and the reproduction/display unit 870. Further, the system control unit 860 includes, for example, a storage device (not shown) that is the recording medium, and a program or the like, which is required for controlling the operation of the imaging system 800, is stored in the storage device. Further, the system control unit 860 supplies, inside the imaging system, a signal for switching the driving mode in accordance with the operation of the user, for example. Specifically, a signal for changing a row to be read out or to be reset, a signal for changing an angle of view in accordance with an electronic zoom, and a signal for shifting an angle of view in accordance with electronic image stabilization are supplied. The timing control unit 850 controls the timing of driving the solid-state imaging apparatus 820 and the image signal processing unit 830 based on the control by the system control unit 860.

In the solid-state imaging apparatus 820 used in this embodiment, the power consumption of the operational amplifier of the read-out circuit is reduced. Therefore, in this embodiment, by mounting the solid-state imaging apparatus 820, the imaging system 800 whose power consumption is reduced can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-165223, filed Aug. 14, 2014, which is hereby incorporated by reference herein in its entirety.

What is claimed is:

1. A solid-state imaging apparatus, comprising:
   a plurality of pixels constituting a pixel array including a plurality of pixel columns; and
   a plurality of amplifier units arranged respectively corresponding to the plurality of pixel columns of the pixel array, and configured to amplify a signal from corresponding one of the plurality of pixel columns,
   the plurality of amplifier units comprising:
      an amplifier having a first input terminal, a second input terminal, and an output terminal;
      an input capacitor having one terminal to which an output signal from corresponding one of the plurality of pixels is input, and another terminal connected to the second input terminal of the amplifier;
a feedback switch connected between the second input terminal and the output terminal of the amplifier; and
a feedback capacitor connected in parallel with the feedback switch and between the second input terminal and the output terminal of the amplifier,
wherein a driving current of the amplifier during a first period is smaller than a driving current of the amplifier during a second period in which the amplifier amplifies the output signal from the corresponding one of the plurality of pixels, and
wherein the feedback switch is set to a connection state during the first period.

2. The solid-state imaging apparatus according to claim 1, wherein the first period comprises at least a part of a period from when read-out of a signal from a pixel in one row of the pixel array is ended to when read-out of a signal from a pixel in a next row is started.

3. The solid-state imaging apparatus according to claim 1, wherein the amplifier unit further comprises a first buffer circuit at an output stage of the amplifier, and
wherein a driving current of the first buffer circuit during the first period is smaller than a driving current of the first buffer circuit during the second period.

4. The solid-state imaging apparatus according to claim 1, further comprising:
a first holding capacitor configured to hold an output signal of the amplifier;
a second buffer circuit to which a signal held in the first holding capacitor is input; and
a second holding capacitor configured to hold a signal output from the second buffer circuit,
wherein a driving current of the second buffer circuit during a period from when an operation of inputting and holding the signal held in the first holding capacitor to and in the second holding capacitor via the second buffer circuit is ended to when a signal from corresponding one of the plurality of pixels is next held in the first holding capacitor is smaller than a driving current of the second buffer circuit during a period in which the second buffer circuit outputs the signal held in the first holding capacitor to the second holding capacitor.

5. The solid-state imaging apparatus according to claim 1, wherein, in a part of the amplifiers arranged so as to correspond to respective columns of the pixel array, the driving current during the first period is smaller than the driving current during the second period, and the feedback switch is set to the connection state during the first period.

6. The solid-state imaging apparatus according to claim 5, wherein the part of the amplifiers is prevented from inputting a signal from the pixel array during the first period.

7. The solid-state imaging apparatus according to claim 1, wherein the solid-state imaging apparatus is capable of changing a pixel column to be subjected to read-out for respective vertical scanning period, and
wherein, in the amplifier corresponding to a column not to be subjected to the read-out, the driving current during the first period is smaller than the driving current during the second period, and the feedback switch is set to the connection state during the first period.

8. An imaging system, comprising the solid-state imaging apparatus of claim 1.

* * * * *